United States Patent [19]

Mulder et al.

[11] 4,213,126
[45] Jul. 15, 1980

[54] AIRPORT SURFACE DETECTION EQUIPMENT (ASDE)

[75] Inventors: Willem Mulder, Borne; Dorotheus C. L. Vaessen, Hengelo; Nicolaas H. De Lange, Rekken, all of Netherlands

[73] Assignee: Hollandse Signaalapparaten B.V., Hengelo, Netherlands

[21] Appl. No.: 968,941

[22] Filed: Dec. 13, 1978

[30] Foreign Application Priority Data

Jan. 6, 1978 [NL] Netherlands .......................... 7800163

[51] Int. Cl.² ................................................ G01S 7/34
[52] U.S. Cl. ................................ 343/5 SM; 343/5 LS
[58] Field of Search ............................ 343/5 SM, 5 LS

[56] References Cited

FOREIGN PATENT DOCUMENTS 797830 7/1958 United Kingdom .................. 343/5 SM Primary Examiner—T. H. Tubbesing
Attorney, Agent, or Firm—Algy Tamoshunas

[57] ABSTRACT

The invention relates to an ASDE radar to supply information on airport surface traffic. A well-known ASDE radar comprises an antenna having an elevation-depending gain factor $$G(\omega) = G(\omega_1) \frac{csc^2 \omega}{csc^2 \omega_1},$$

for $\omega_1 \leq \omega < \omega_2$, where $\omega_1$, $\omega$ and $\omega_2$ represent angles of depression. In such a radar, the echo power of an airport surface target is independent of the distance, whereas the echo power of rain clutter is inversely proportional to the square of the distance. Consequently, a remote surface target still projected on the radar screen above the rain clutter, is likely to disappear in the rain clutter when approaching the radar; this may result in fatal consequences. To solve the above problem, the ASDE radar of the invention comprises a combination of an antenna having a gain factor $$G(\omega) = G(\omega_1) \cdot \frac{csc \, \omega}{csc \, \omega_1},$$

and a sensitivity time control circuit in its receiver.

4 Claims, 7 Drawing Figures

AIRPORT SURFACE DETECTION EQUIPMENT (ASDE)

The invention relates to airport surface detection equipment (ASDE radar), with an antenna mounted on a raised platform to produce a dipped beam.

The purpose of such equipment is to provide air traffic controllers of airport an airport with information on the location of surface traffic. The surface traffic is not confined solely to the moving traffic of the airport, but also includes parked road vehicles and aircraft, since information on all surface traffic is essential to an air traffic controller in handling the incoming and departing air traffic.

The above ASDE radar is described by M. I. Skolnik in "Introduction to Radar Systems," 1962, where the radar is provided with an inverted cosecant squared antenna, i.e. an antenna with an elevation-depending gain factor $$G(\omega) = G(\omega_1) \cdot \frac{\csc^2\omega}{\csc^2\omega_1},$$

for $\omega_1 \leq \omega < \omega_2$, where $\omega_1$, $\omega$ and $\omega_2$ represent angles of depression. One characteristic of an ASDE radar with the above type of antenna is that the detected echo power from an airport surface target is independent of the distance so that the detected echo power of the moving traffic remains constant. However a disadvantage of ASDE radar with the above type of antenna is that the detected echo power from rain clutter varies with the range in a manner such that the echo power is inversely proportional to the square of the distance. This gives rise to situations in which a moving vehicle or aircraft, located at a long range from the radar and still projected on the radar screen above the rain clutter, will disappear in the rain clutter as it approaches the radar. The air traffic controllers are hence deprived of information on such a vehicle or aircraft, and fatal consequences may be result.

The object of the invention is to provide a solution to the above problem, such that a moving vehicle or aircraft located at a long range from the radar and projected on the radar screen above the rain clutter, is kept projected above the rain clutter even when the vehicle or aircraft approaches the radar.

According to the invention, the ASDE radar comprises a combination of an inverted cosecant antenna, i.e. an antenna with an elevation-depending gain factor $$G(\omega) = G(\omega_1) \cdot \frac{\csc \omega}{\csc \omega_1},$$

for $\omega_1 \leq \omega < \omega_2$, where $\omega_1$, $\omega$ and $\omega_2$ represent angles of depression, and a sensitivity time control (STC) circuit in the radar receiver.

The invention and its advantages will now be described with reference to the accompanying figures, in which:

FIG. 3 is a block diagram of a feasible embodiment of a sensitivity time control circuit in the receiver of an ASDE radar in accordance with the invention; while

Figure 1:
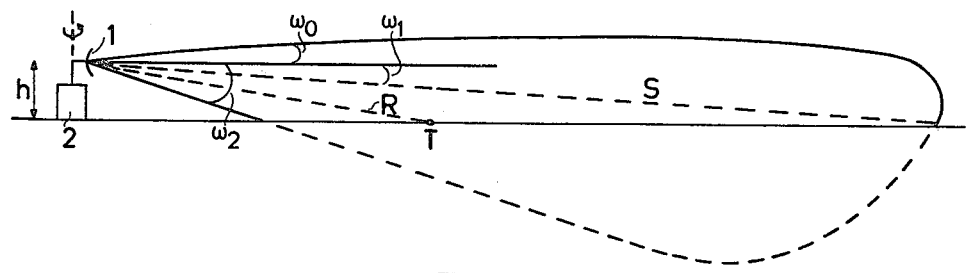
FIG. 1 is an elevation view of an ASDE radar having a radiation pattern in accordance with the invention.

FIG. 1 illustrates an ASDE radar with the antenna 1 mounted on a raised platform 2, such as an air traffic control tower. The radar is of the search type, where the antenna 1 is so constructed and directed that the antenna beam pattern extends essentially downwards. Hence, this radar is ideally suited to gain an insight into and information on the surface traffic in the vicinity of an air traffic control tower.

It is commonly known to equip an ASDE radar with an inverted cosecant squared antenna, i.e. an antenna with a gain factor $$G(\omega) = G(\omega_1) \cdot \frac{\csc^2\omega}{\csc^2\omega_1}, \text{ for } \omega_1 \leq \omega < \omega_2,$$

where $\omega_1$ and $\omega_2$ represent angles of depression. Because of diffraction phenomena at the edges of such an antenna, it is however impossible to design an antenna with the above prescribed gain factor within the angle interval $(\omega_1, \omega_2)$ and a gain factor of zero outside this interval. In practice, such an antenna will show a deviation for the gain factor in the vicinity of the limit values $\omega_1$ and $\omega_2$, while the gain factor outside the above angle interval has an acceptably low value. To retain a better control of the prescribed variation in the gain factor near the angle $\omega_1$, it is customary to also prescribe a fixed gain factor for angular values $\omega$ for $\omega < \omega_1$, where the variation of this factor should correspond with the previously defined gain for the angle $\omega = \omega_1$. This is satisified for instance, by the prescribed gain $G(\omega) = G(\omega_1)$ for $\omega_0 < \omega < \omega_1$. In such a case, the echo power received by the antenna 1 equals:

$$P(\omega) = \frac{P_o \cdot G^2(\omega_1) \cdot \lambda^2 \cdot \sigma \cdot \csc^4\omega}{(4\pi)^3 \cdot R^4 \cdot \csc^4\omega_1}, \text{ for } \omega_1 \leq \omega < \omega_2, \text{ and}$$

$$P(\omega) = \frac{P_o \cdot G^2(\omega_1) \cdot \lambda^2 \cdot \sigma}{(4\pi)^3 \cdot R^4} \text{ for } \omega_0 < \omega < \omega_1$$

where:
$P_0$=the total power radiated by the antenna;
$\lambda$=the wavelength of the emitted radiation;
$R$=the distance between the antenna and the target detected;
$\sigma$=the radar cross section of the target.

For the sake of simplicity, the antenna beam may therefore be considered to be composed of two separate beams, viz. a pencil beam for $\omega_0 < \omega < \omega_1$ and a small inverted cosecant squared beam for $\omega_1 \leq \omega < \omega_2$.

An ASDE radar with an antenna at hight h detects a target T at a distance R, where $R = h \csc \omega < h \csc \omega_1$, and the echo power is expressed by:

$$P(\omega) = \frac{P_o \cdot G^2(\omega_1) \cdot \lambda^2 \cdot \sigma}{(4\pi)^3 \cdot R^4 \cdot \csc^4\omega_1} \cdot \left(\frac{R}{h}\right)^4 = \frac{P_o \cdot G^2(\omega_1) \cdot \lambda^2 \cdot \sigma}{(4\pi)^3 \cdot h^4 \cdot \csc^4\omega_1}.$$

The above shows that the echo power is independent of the distance R between the antenna and the target T, but does depend on the radar cross section $\sigma$.

The advantage of a range-independent detection capability of the ASDE radar is entirely lost in the case when the radar operates in rainy weather. This is seen from the signal-noise ratio of echoes from the target T and from meteorological particles M, such as raindrops, as expressed by the following relationship:

$$\frac{(S/N)_T}{(S/N)_M} = G^2(\omega_1) \cdot \frac{\csc^4\omega}{\csc^4\omega_1} \cdot \sigma_T \cdot$$

$$\left[ \left( \int_{\omega_0}^{\omega_1} G^2(\omega_1) \cdot \sigma_M(\omega)d\omega + \int_{\omega_1}^{\omega_2} G^2(\omega_1) \cdot \frac{\csc^4\omega}{\csc^4\omega_1} \cdot \sigma_M(\omega)d\omega \right) \right]^{-1},$$

and: $\sigma_M = \frac{25 \cdot \pi^6 \cdot R^2 \cdot l|K|^2 \cdot r^{1.6}}{\lambda^4}$, where:
1 = the length equivalent of the pulse duration $\tau$;
K = a constant, depending on the dielectric constant of the scattering meterorological particles M,
r = a measure for the rainfall, according to M. I. Skolnik:
Introduction to Radar Systems, 1962, Sec. 12.5

Working out this relationship for the signal-noise ratios, where the angular values $\frac{1}{2}\omega_1$ and $\frac{1}{2}\omega_2$ incurred may be considered small ($\omega_1 \simeq 4°-6°$ and $\omega_2 \simeq 16°-20°$), the following relation, expressed in dB, is obtained:

$$\left[\frac{(S/N)_T}{(S/N)_m}\right]_{db} =$$

$$10 \log \cdot \frac{R^2 \cdot \omega_1^3 \cdot \lambda^4 \cdot \sigma_T}{25 \cdot \pi^6 \cdot l|K|^2 \cdot r^{1.6} \cdot h^2} = \text{constant} + 20 \log R.$$

This relationship shows that a moving vehicle or aircraft T, if projected on the radar screen well above the rain clutter at a large distance R from the radar, will produce a series of echo signals as of decreasing strength it approaches the radar antenna and, hence, may disappear in the rain clutter; this may have fatal consequences.

According to the invention, the ASDE radar comprises a modified antenna, viz. an inverted cosecant antenna, i.e. an antenna having a gain factor $$G(\omega) = G(\omega_1) \cdot \frac{\csc \omega}{\csc \omega_1},$$

where $\omega_1 \leq \omega < \omega_2$ for the angles of depression $\omega_1$, $\omega$ and $\omega_2$. Also here, it is preferable to supplement the gain factor requirement with $G(\omega) = G(\omega_1)$ for $\omega_0 < \omega < \omega_1$. In such a case, the echo power received by the antenna 1 is equal to:

$$P(\omega) = \frac{P_o \cdot G^2(\omega_1) \cdot \lambda^2 \cdot \sigma \cdot \csc^2\omega}{(4\pi)^3 \cdot R^4 \cdot \csc^2\omega_1} \text{ for } \omega_1 \leq \omega < \omega_2 \text{ and}$$

$$P(\omega) = \frac{P_o \cdot G^2(\omega_1) \cdot \lambda^2 \cdot \sigma}{(4\pi)^3 \cdot R^4} \text{ for } \omega_0 < \omega < \omega_1.$$

In this case as well, the antenna beam may be considered to consist of two separate beams, viz. a pencil beam for $\omega_0 < \omega < \omega_1$ and a small inverted cosecant beam for $\omega_1 \leq \omega < \omega_2$.

The ASDE radar according to the invention thus detects a target T at a distance R, where $R = h \csc \omega < h \csc \omega_1$, and the echo power:

$$P(\omega) = \frac{P_o \cdot G^2(\omega_1) \cdot \lambda^2 \cdot \sigma}{(4\pi)^3 \cdot R^4 \cdot \csc^2\omega_1} \cdot \left(\frac{R}{h}\right)^2,$$

which shows that the detection of a target T varies with the distance. The insertion of an $R^2$ sensitivity time control in the receiver circuit of the ASDE radar provides a solution however. Although the inclusion of such a control in a receiver must be considered as a disadvantage of the ASDE radar, this disadvantage is outweighed by the great advantage gained in the detection of targets in rainy weather. For the signal-noise ratio of target T and of the meteorological particles M can now be expressed by the relation:

$$\frac{(S/N)_T}{(S/N)_M} = G^2(\omega_1) \cdot \frac{\csc^2\omega}{\csc^2\omega_1} \cdot \sigma_T \cdot$$

$$\left[ \left( \int_{\omega_0}^{\omega_1} G^2(\omega_1) \cdot \sigma_M(\omega)d\omega + \int_{\omega_1}^{\omega_2} G^2(\omega_1) \cdot \frac{\csc^2\omega}{\csc^2\omega_1} \cdot \sigma_M(\omega)d\omega \right) \right]^{-1},$$

which —for small angles $\omega_1$—may be reduced to:

$$\left[\frac{(S/N)_T}{(S/N)_M}\right]_{db} =$$

$$10 \log \frac{\lambda^4 \cdot \sigma_T}{25\pi^6 \cdot l|K|^2 \cdot r^{1.6} \cdot h^2(2/\omega_1 - \cot\omega_2)} = \text{constant},$$

i.e. independent of the distance R of the target T. As a result, if a moving vehicle or aircraft T at a far distance R is projected above the rain clutter, this vehicle or aircraft retains its intensity when it approaches the radar antenna. To improve the sub-clutter visibility, the ASDE radar according to the invention may further be designed to transmit and receive linearly or circularly polarised radiation.

An inverted cosecant antenna may be designed in various ways; hence, the invention is not confined to the application of one given type of antenna. On the contrary, any type of antenna satisfying to the gain factor requirement is suitable for application in an ASDE radar according to the invention. The techniques used for the design of an inverted cosecant squared antenna (see Skolnik: Introduction to Radar Systems, 1962, Sec. 7.9) are also applicable for the design of an inverted cosecant antenna.

Figure 2:
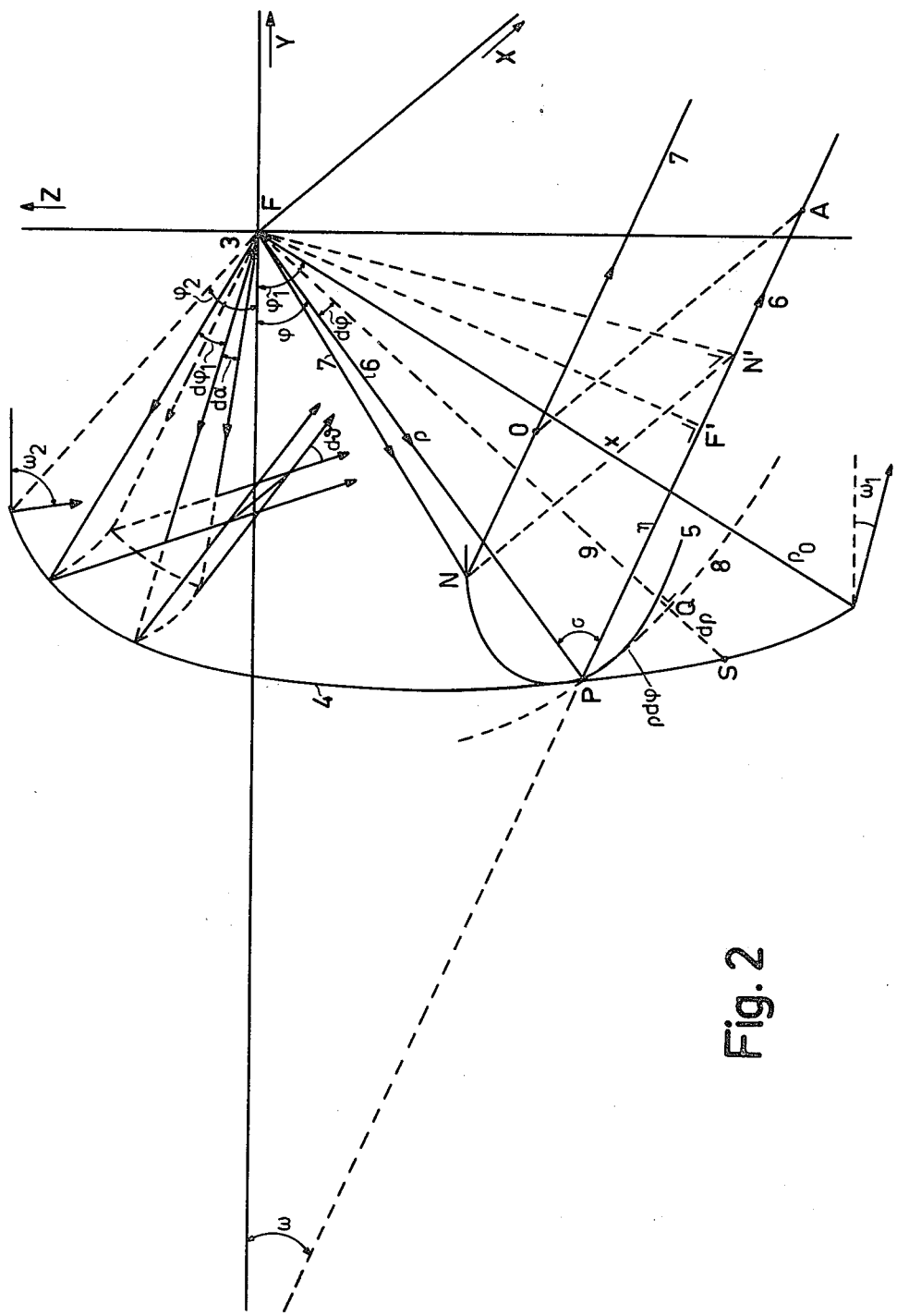
FIG. 2 is a sketch of a doubly curved antenna.

A feasible embodiment of a suitable antenna for the ASDE radar according to the invention will now be described with reference to FIG. 2, illustrating a sketch of an antenna type which comprises a point or quasi-point radiator 3 located at point F and a doubly curved reflector 4. Further the shape of this antenna should be such that the radiation beam in azimuth is narrow and in elevation of the form:

$$G(\omega) = G(\omega_1) \cdot \frac{\csc \omega}{\csc \omega_1} \text{ for } \omega_1 \leq \omega < \omega_2.$$

The vertical antenna plane of symmetry is designated YFZ in FIG. 2, where Y and Z are the coordinate axes of the selected XYZ coordinate system. A plane passing through P, which is perpendicular to the antenna plane of symmetry and contains reflected parallel rays, intersects the reflector 4 in accordance with curve 5. The angle between the plane containing curve 5 and the plane perpendicular to the Z axis is designated $\omega$.

Further, in FIG. 2, two rays 6 and 7 are drawn from F and reflected respectively at P (an arbitrary point) and N of curve 5, where P lies in the antenna plane of symmetry YFZ. Points A and O of rays 6 and 7, respectively, lying on a plane wavefront in the plane of curve 5 are expressed by the relation: $FP+PA=FN+NO$, whence: $FN=\rho(\phi)+\eta$, where $FP=\rho(\phi)$ and $PN'=\eta$, while N' is the point of projection of N on line 6. If x is the distance NN', F' the projection of F on PN', and $\sigma$ the angle between the ray incident on point P and the ray reflected from P, FN then be expressed by:

$$FN^2 = NN'^2 + N'F'^2 + FF'^2 = x^2 + (\eta - \rho(\phi)\cos\sigma)^2 + \rho^2(\phi)\sin\sigma^2$$

where $\sigma = \omega + \phi$.

The two relations for FN give: $x^2 = 4\eta\,\rho(\phi)\cos^2\tfrac{1}{2}\sigma$; this shows that curve 5 is a parabola with vertex P and focal length $f = \rho(\phi)\cos^2\sigma/2 = \tfrac{1}{2}\rho(\phi)\cdot(1+\cos\sigma)$, to be set out along line PF'.

The coordinates $X_N$, $Y_N$ and $Z_N$ of such a point P on curve 5 can then be expressed by:

$$X_N = X$$
$$Y_N = Y_{N'} = -\rho(\phi)\cos\phi + \eta\cos\omega =$$
$$-\rho(\phi)\cos\phi + \frac{x^2\cos\omega}{4\rho(\phi)\cos^2(\frac{\sigma}{2})}$$
$$Z_N = Z_{N'} = \rho(\phi)\sin\phi + \eta\sin\omega =$$
$$\rho(\phi)\sin\phi + \frac{x^2\sin\omega}{4\rho(\phi)\cos^2(\frac{\sigma}{2})}$$

where $\phi$ is the angle between the line PF and the negative y-axis. The calculation of the numerical values of the coordinates for such an antenna should be based on the initial conditions for $\phi$, $\omega$ and $\rho(\phi)$, as specified by the antenna dimensions and the desired antenna pattern. These initial conditions should preferably be related to a point on that side of the antenna surface from which a high gain must be obtained. Such a point is situated at the bottom side of the reflector 4 in FIG. 2, while the initial conditions $\phi_1$, $\omega_1$ and $\rho_0(\phi_1)$ are established for this point.

In the above expressions for the X, Y and Z coordinates, the variables $\sigma$, $\rho(\phi)$ and $\omega$ must be eliminated, making these relations dependant on x and $\phi$ only. Consider therefore through P an arc 8 of a circle of radius $\rho(\phi)$ and centre F. A line 9 from F then intersects arc 8 at Q and the reflector 4 at S. For infinitesimal triangles PQS the following geometric differential equation is applicable:

$$\tan\frac{\sigma}{2} = \tan(\angle SPQ) = \frac{SQ}{PQ} = -\frac{d\rho(\phi)}{\rho(\phi)d\phi}$$

giving: $\ln\left(\frac{\rho(\phi)}{\rho_0(\phi_1)}\right) = \int_{\phi_1}^{\phi}\tan(\frac{\sigma}{2})d\phi$.

For a horn feed acting as a point radiator at F, the radiation distribution function I for the power radiated per unit of solid angle is generally dependent upon the angles $\phi$ and $\alpha$. However, since $\phi$ and $\alpha$ are independent of each other and the desired gain factor $G(\omega)$ in the YZ plane are hardly affected by the $\alpha$-depending part of the distribution function I, it is sufficient to consider this function as a $\phi$-depending function $I(\phi)$. Hence, the power radiated within the solid angle $d\phi_1 \cdot d\alpha$ is equal to $I(\phi)\cdot d\phi_1\cdot d\alpha$. The rays obtained after reflection are parallel in one direction forming a width of $\rho(\phi)d\alpha$, while in the direction normal thereto the rays converge and subsequently diverge in keeping with a certain angle $d\omega$. The parallelism implies a pencil beam in the XY plane, while in the YZ plane the gain function G depends upon the angle $\omega$: thus $G = G(\omega)$. The radiation incident within the sector with apex angle $d\omega$ and width $\rho(\phi)d\alpha$ represents a power of $K\cdot G(\omega)\rho(\omega)d\alpha\cdot d\omega$, where K is a constant. Applying the law of conservation of energy, $I(\phi)\cdot d\phi_1\cdot d\alpha = K\cdot G(\phi)\cdot\rho(\phi)d\omega d\alpha$.

The angular values $\omega_1$ and $\omega_2$ for the rays reflected from the reflector are related to the angular values $\phi_1$ and $\phi_2$ for the rays incident on the reflector; therefore the constant K can be determined from:

$$K^{-1}\int_{\phi_1}^{\phi_2}I(\phi)d\phi' = \int_{\omega_1}^{\omega_2}G(\omega)\rho(\phi)d\omega.$$

Since the fractional powers for incident and reflected radiation must be equal to each other, the following relation is obtained:

$$K^{-1}\int_{\phi_1}^{\phi}\frac{I(\phi)}{\rho(\phi)}d\phi = \int_{\omega_1}^{\omega}G(\omega)d\omega \text{ or}$$

$$\frac{\int_{\phi_1}^{\phi}\frac{I(\phi)}{\rho(\phi)}d\phi}{\int_{\phi_1}^{\phi_2}\frac{I(\phi)}{\rho(\phi)}d\phi} = \frac{\int_{\omega_1}^{\omega}G(\omega)d\omega}{\int_{\omega_1}^{\omega_2}G(\omega)d\omega}$$

Since the function $I(\phi)$ in the above integral equation is generally known only in numerical form, the integrations must be carried out graphically.

The expression $$\rho(\phi) = \frac{2f}{1+\cos\sigma}$$

is, as such, unsuitable for substitution in a $\phi$-depending integral expression, since the angle $\sigma$ for $\sigma = \omega + \phi$ cannot be directly expressed in terms of angle $\phi$ because angle $\omega$, although directly varying with angle $\phi$, does not have a simple relationship with angle $\phi$; furthermore, f is not constant but because of the definition $f = \tfrac{1}{2}\rho(\phi)(1+\cos\sigma)$ is a complicated function of angle $\phi$. Therefore, for angle $\sigma$, the approximating expression $\sigma \approx \phi$ is taken in the first instance and for $\rho(\phi)$:

$$\rho(\phi) = \frac{2f_1}{1+\cos\phi}, \text{ where } f_1 = \tfrac{1}{2}\rho_0(\phi_1)\cdot(1+\cos\phi_1).$$

Substituting the expression for $\rho(\phi)$ into the latter integral equation gives a relation between $\omega$ and $\phi$, thus $\omega = \omega(\phi)$; hence, $\sigma = \phi + \omega$ is also determined as a function of $\phi$. Subsequently, the equation:

$$\ln\frac{\rho(\phi)}{\rho_0(\phi_1)} = \int_{\phi_1}^{\phi}\tan\frac{\sigma}{2}d\phi$$

can be used to determine a better expression for $\rho(\phi)$. By substituting $\rho(\phi)$ again into the integral equation, a new value for $\omega$ and hence for $\sigma$ is obtained; thus by iterative operation a series of $\sigma$ values, $\sigma(\phi)$, $\sigma_1(\phi)$, $\sigma_2(\phi)$, ..., etc. is produced, while the integral equation derived from the geometric differential equation gives a series of $\rho$-values: $\rho(\phi)$, $\rho_1(\phi)$, $\rho_2(\phi)$, ..., etc. A usable value for $\rho(\phi)$ with the corresponding $\sigma$-value is then obtained if the difference between two consecutive $\rho$-values from this series has assumed a value smaller than an arbitrarily fixed tolerance $\epsilon$. Denoting these usable values by $\bar{\rho}$ with the corresponding $\bar{\sigma}$ and $\bar{\omega} = \bar{\sigma}(\phi) - \phi$, the antenna coordinates are expressed by:

$$\begin{cases} X_N = x \\ Y_N = -\bar{\rho} \cdot \cos\phi + \dfrac{x^2 \cos\bar{\omega}}{4\bar{\rho}\cos^2(\frac{\bar{\sigma}}{2})} \\ Z_N = \bar{\rho} \cdot \sin\phi + \dfrac{x^2 \sin\bar{\omega}}{4\bar{\rho}\cos^2(\frac{\bar{\sigma}}{2})}. \end{cases}$$

These coordinates are now dependent upon x and $\phi$ only, thus determining the shape of an inverted cosecant antenna.

If the gain factor is not defined exclusively for the interval ($\omega_1$; $\omega_2$) (to obtain an inverted cosecant beam pattern), but also for the interval ($\omega_0$; $\omega_1$), for instance for a pencil beam pattern, a calculation similar to that above can be applied provided that the values $\phi_1$, $\phi_1$ and $\rho_0(\phi_1)$ in the required formulas are replaced with $\phi_0$, $\omega_0$ and $\rho_0(\phi_0)$ respectively, and that the appropriate gain formula for the respective angle interval is applied. Also further extensions of the antenna beam pattern outside the interval ($\omega_1$; $\omega_2$) are permitted.

It is also possible to use, instead of a doubly curved reflector and a point radiator, a singly curved reflector with a line feed (such as a slotted radiator) to obtain the inverted cosecant antenna pattern. The coordinates for such an antenna pattern are expressed by:

$$X = x$$

$$Y = -\bar{\rho}(\phi) \cdot \cos\phi$$

and $$Z = \bar{\rho}(\phi) \cdot \sin\phi.$$

As previously stated, an inverted cosecant antenna is to be used in combination with a sensitivity time control (STC) circuit.

Figure 3:
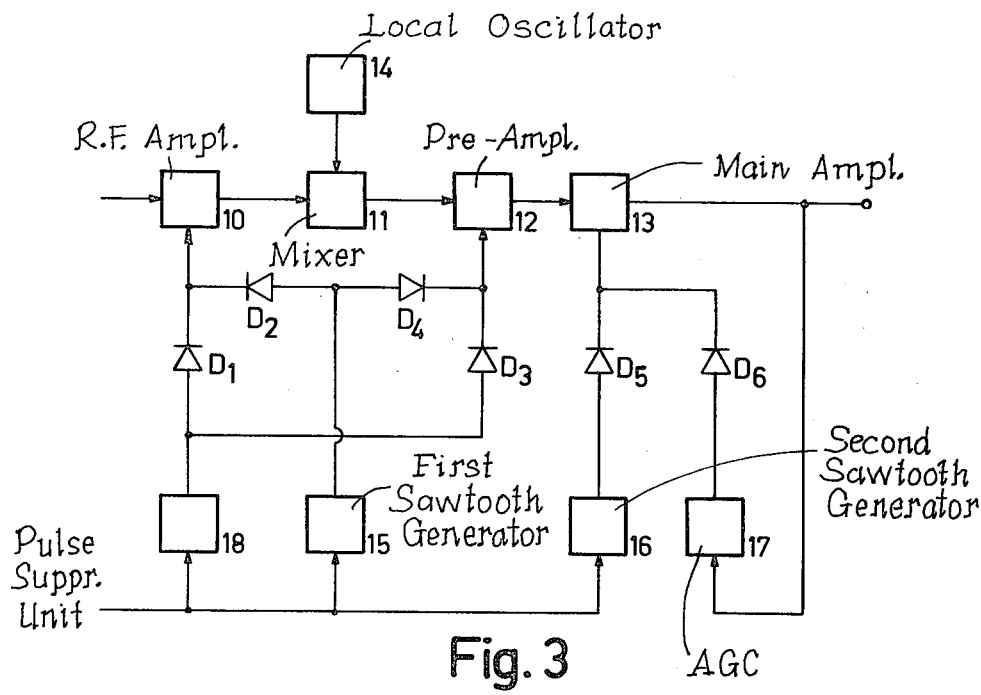

An STC circuit is described in M. I. Skolnik: Introduction to Radar Systems, 1962, Secs. 8.2 and 12.4; the gain factor of this circuit varies with the 4th power ($R^4$) of the range, i.e. it varies with the 4th power of the time which has elapsed since the last pulse transmitted. In principle, the STC circuit to be used should have a gain varying with the square of the range, as stated before. A feasible embodiment of such an STC circuit of the ASDE radar in accordance with the invention, is illustrated in FIG. 3.

The STC circuit in this figure comprises an r.f. amplifier 10, a mixer 11, a preamplifier 12 and a main amplifier 13, all interconnected in the given sequence. The r.f. echo signal received by the antenna is supplied to the r.f. amplifier 10 to produce a usually stronger signal, which is transformed in the mixer 11 into an i.f. signal by means of the output signal of a local oscillator 14. The output signal of mixer 11 is then applied to the preamplifier 12 and the main amplifier 13.

For the voltage control of the r.f. amplifier 10, the preamplifier 12 and the main amplifier 13, the STC circuit further comprises a first sawtooth generator 15, a second sawtooth generator 16 and an AGC circuit 17, while for the signal suppression at the instant of the transmitter pulse the STC circuit is also provided with a pulse suppression unit 18. The output voltage of suppression unit 18 and of the sawtooth generator 15 are supplied to the r.f. amplifier 10 via separate diodes $D_1$ and $D_2$, and to the preamplifier 12 via separate diodes $D_3$ and $D_4$. For the voltage control of the main amplifier 13 the output voltages of the sawtooth generator 16 and the AGC circuit 17 are available. These output voltages are applied to the main amplifier 13 via separate diodes $D_5$ and $D_6$.

Figures 4A, 4B, 4C, 4D:
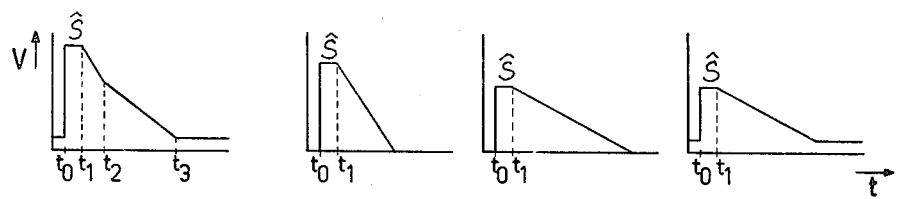
FIGS. 4A–D illustrate a number of voltage characteristics in explanation of the gain circuit in FIG. 3.

The slope of the output voltage of each of the sawtooth generators should be such a value that the STC circuit exhibits predominantly the desired characteristic, i.e. a voltage characteristic varying with the square of the distance R (see FIG. 4A). The voltage characteristics of the sawtooth generators 15 and 16 are illustrated in FIGS. 4B and 4C respectively, while the AGC voltage-corrected characteristic for the input voltage of the main amplifier 13 is shown in FIG. 4D. From a time $t_0$, directly preceding the instant of the synchronisation pulse $\hat{S}$, to time $t_1$ when the transmitter produces a pulse, the pulse suppression unit 18 and the sawtooth generators 15 and 16 receive a square pulse, in the presence of which the output voltage of the suppression unit 18 is increased. The sawtooth generators 15 and 16 are however activated, but still produce a constant output voltage. Therefore, in the entire receiver amplification range the part of the gain characteristic lying between times $t_0$ and $t_1$ is constant.

From time $t_1$ when the square pulse disappears, the sawtooth generator 15 produces an output voltage following a fixed slope, so that the control voltage of the r.f. amplifier 10 and preamplifier 12 will vary accordingly.

From time $t_2$, the control voltage of the sawtooth generator 16 will be dominant at the main amplifier 13. Consequently, from time $t_2$, the total gain characteristic will show a different slope.

Since the AGC circuit 17 drives the main amplifiers 13 in such a way that the gain characteristic (see FIG. 4A) in the entire receiver amplification range remains constant, this gain characteristic will have a maximum value at a time preceding $t_0$ and following on a certain time $t_3$.

The slope of the consecutive rectilinear fractions of the characteristic in FIG. 4A will be of such a value that the variation of the gain characteristic will be approximately quadratic.

It may be desirable to adjust the slope values in order to attenuate meteorological echoes by a factor exp(-$-\alpha R$), where $\alpha$ is an attenuation coefficient (see M. I. Skolnik: Introduction to Radar Systems, 1961, Sec. 12.5).

An obvious variant of the above STC circuit is obtained when, instead of separate amplifiers 12 and 13, a single amplifier is used. In such a case, the voltages supplied via diodes $D_3$, $D_4$, $D_5$ and $D_6$ should be applied to such an amplifier via a common line.

We claim:

1. An ASDE radar comprising an antenna having an elevation-depending gain factor $$G(\omega) = G(\omega_1) \cdot \frac{csc\ \omega}{csc\ \omega_1}$$

for $\omega_1 \leq \omega < \omega_2$ where $\omega_1$, $\omega$ and $\omega_2$ represent angles of depression and a receiver having a sensitivity time control circuit.

2. An ASDE radar as claimed in claim 1, wherein the antenna has a gain factor $G(\omega) = G(\omega_1)$ for $\omega < \omega_1$.

3. An ASDE radar as claimed in claim 1 or 2, wherein the antenna comprises a singly curved reflector with a line feed.

4. An ASDE radar as claimed in claim 1 or 2 wherein the sensitivity time control circuit has a gain factor which is inversely proportional to the square of the distance.

* * * * *